(No Model.)

E. S. SNYDER.
Saw Tooth.

No. 241,082. Patented May 3, 1881.

WITNESSES:
Fred. G. Dieterich
A. G. Syne

INVENTOR:
E. S. Snyder
BY
ATTORNEYS.

UNITED STATES PATENT OFFICE.

ELISHA S. SNYDER, OF SNYDER'S MILLS, WEST VIRGINIA.

SAW-TOOTH.

SPECIFICATION forming part of Letters Patent No. 241,082, dated May 3, 1881.

Application filed March 11, 1881. (No model.)

*To all whom it may concern:*

Be it known that I, ELISHA S. SNYDER, a citizen of the United States, residing at Snyder's Mills, in the county of Jefferson and State of West Virginia, have invented a new and useful Inserted Saw-Tooth, of which the following is a full, clear, and exact description, reference being had to the accompanying drawings forming part of this specification.

My invention has for its object the protection of saws from all unnecessary wear; and it consists in an expansible concavo-convex steel plate, which is inserted endwise between the ribbed edge of a slot cut in the periphery of a saw and the grooved edge of a false tooth which is keyed in the said slot.

Figure 1:
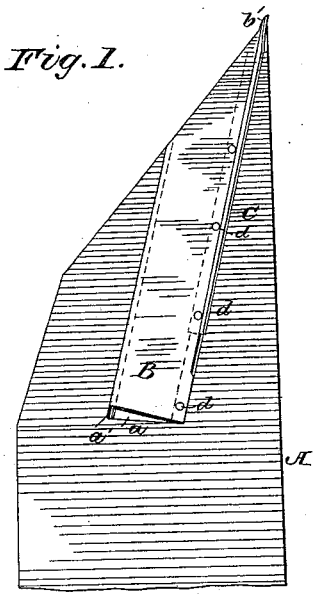
Figure 2:
Figures 3, 4:
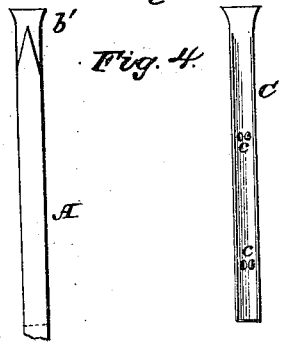

In the accompanying drawings, Figure 1 represents a side view of my inserted saw-tooth; Fig. 2, a transverse section; Fig. 3, a partial view of front edge of tooth; and Fig. 4 the semi-cylindrical cutting-plate.

A represents a tooth of a saw, having a slot, $a$, of any desired width cut in its outer edge immediately to the rear of its extreme point, the edges $a'$ of which are ribbed, in order that they may engage with the grooved edges $b$ of the false tooth B, which is inserted therein, and hold it in position. Between the forward edge of said false tooth and the corresponding edge of the slot is fitted an expansible semi-cylindrical or grooved steel plate, C, provided with a cutting-edge at its outer end, which is also flattened by a hammer to give it the desired set. The said false tooth is provided with a corresponding set, $b'$, which passes immediately behind the set in the said plate, giving it the requisite strength for cutting. The plate is secured adjustably by pins $d$ passing through a series of lateral perforations, $c$, in the plate, and corresponding perforations $e$ and $f$ in the false tooth and edge of the slot respectively.

It will be seen that as the edge of this plate wears off it may be adjusted outwardly and its end flattened and sharpened, as stated above, so that the entire wear is thrown upon the same; and as the cost of these plates is small the necessity of purchasing new saws to replace old ones is thus obviated.

The false tooth, at its inner end, is made to fit the sides of the slot closely, and pinned therein, so that as the cutting-plate is drawn out it will remain firm in position.

I am aware that a removable saw-tooth has before been used. I therefore do not broadly claim such a tooth; but

What I claim is—

An inserted adjustable saw-tooth consisting in an expansible concavo-convex steel plate, which is held by transverse pins between the corresponding edges of a false tooth which is provided with a set and of a slotted saw into which the false tooth is keyed, substantially as shown and described, and for the purpose set forth.

ELISHA S. SNYDER.

Witnesses:
 A. G. LYNE,
 SOLON C. KEMON.